March 19, 1957 J. W. MILLER ET AL 2,785,509
TUBE SEALING AND TIP-OFF MECHANISM
Filed July 8, 1952 3 Sheets-Sheet 1
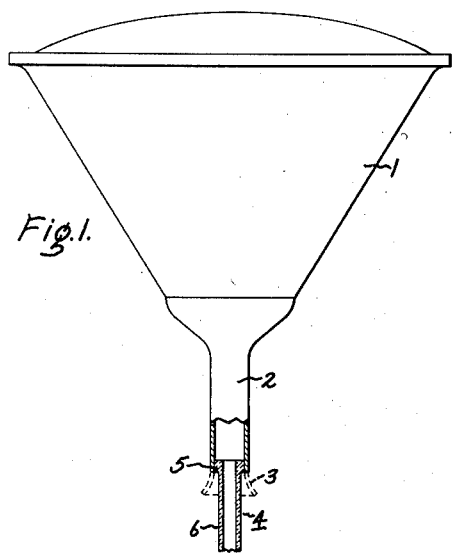
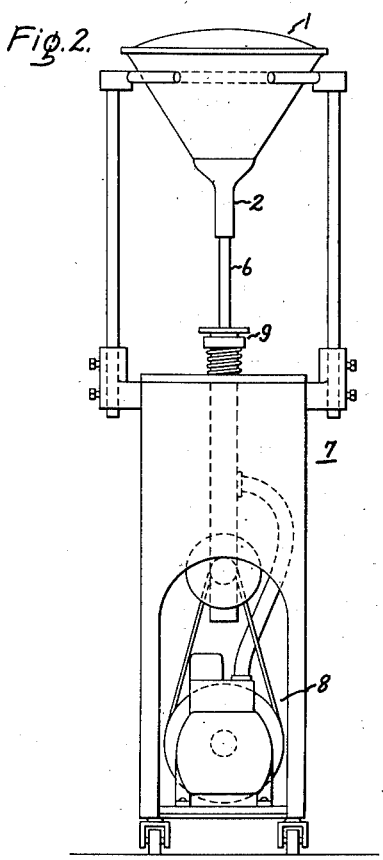
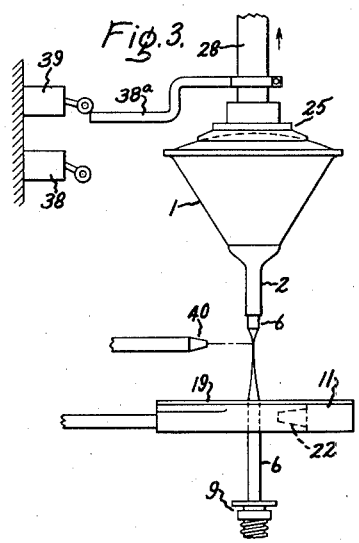
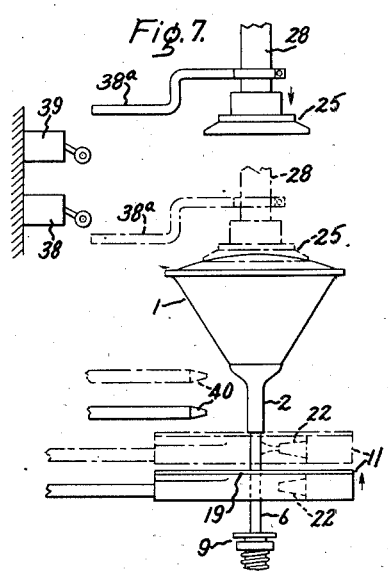
Inventors:
Cletus P. Sherman,
John W. Miller,
by Merton D Moore
Their Attorney.

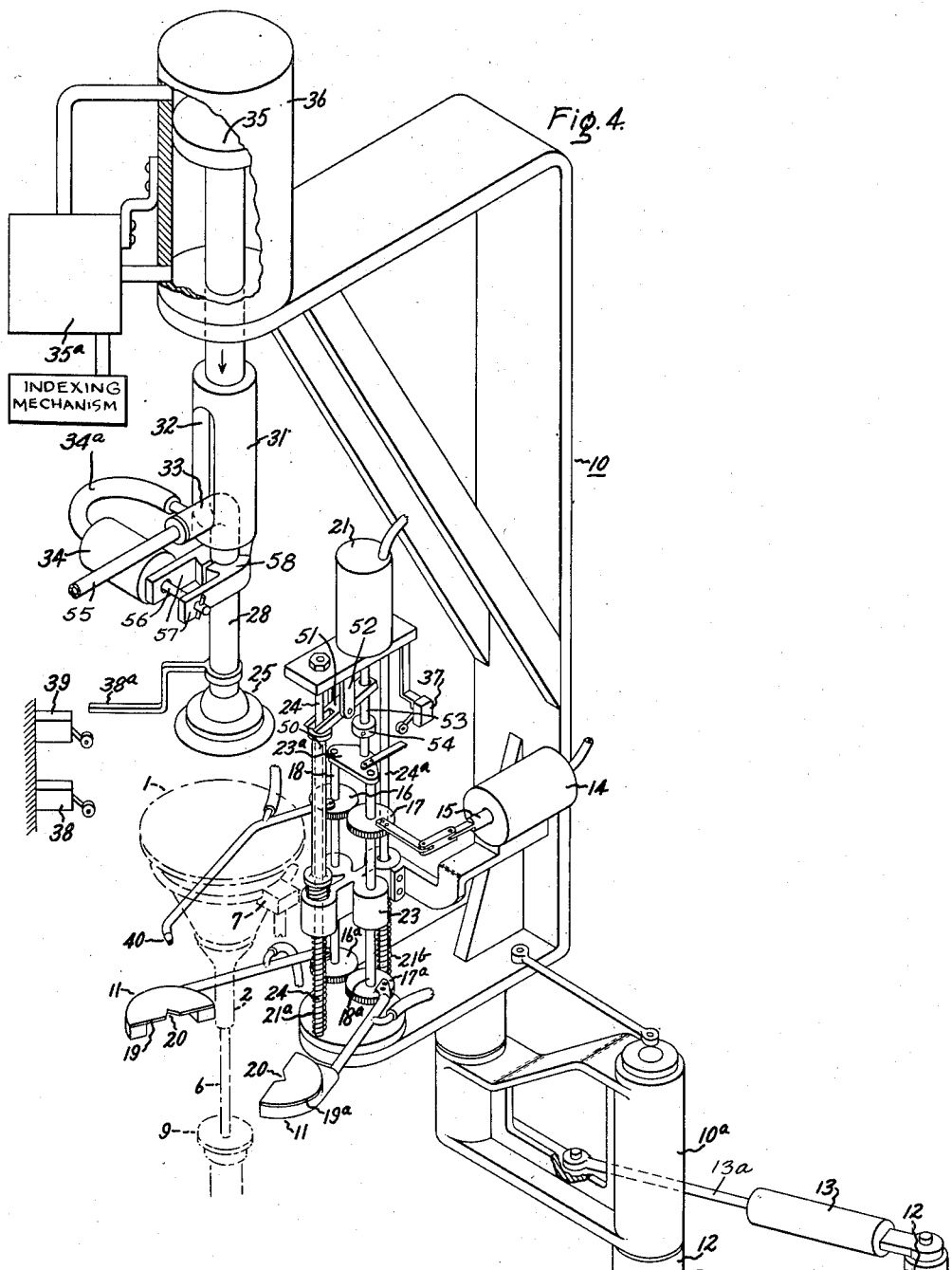

March 19, 1957  J. W. MILLER ET AL  2,785,509
TUBE SEALING AND TIP-OFF MECHANISM
Filed July 8, 1952  3 Sheets-Sheet 3
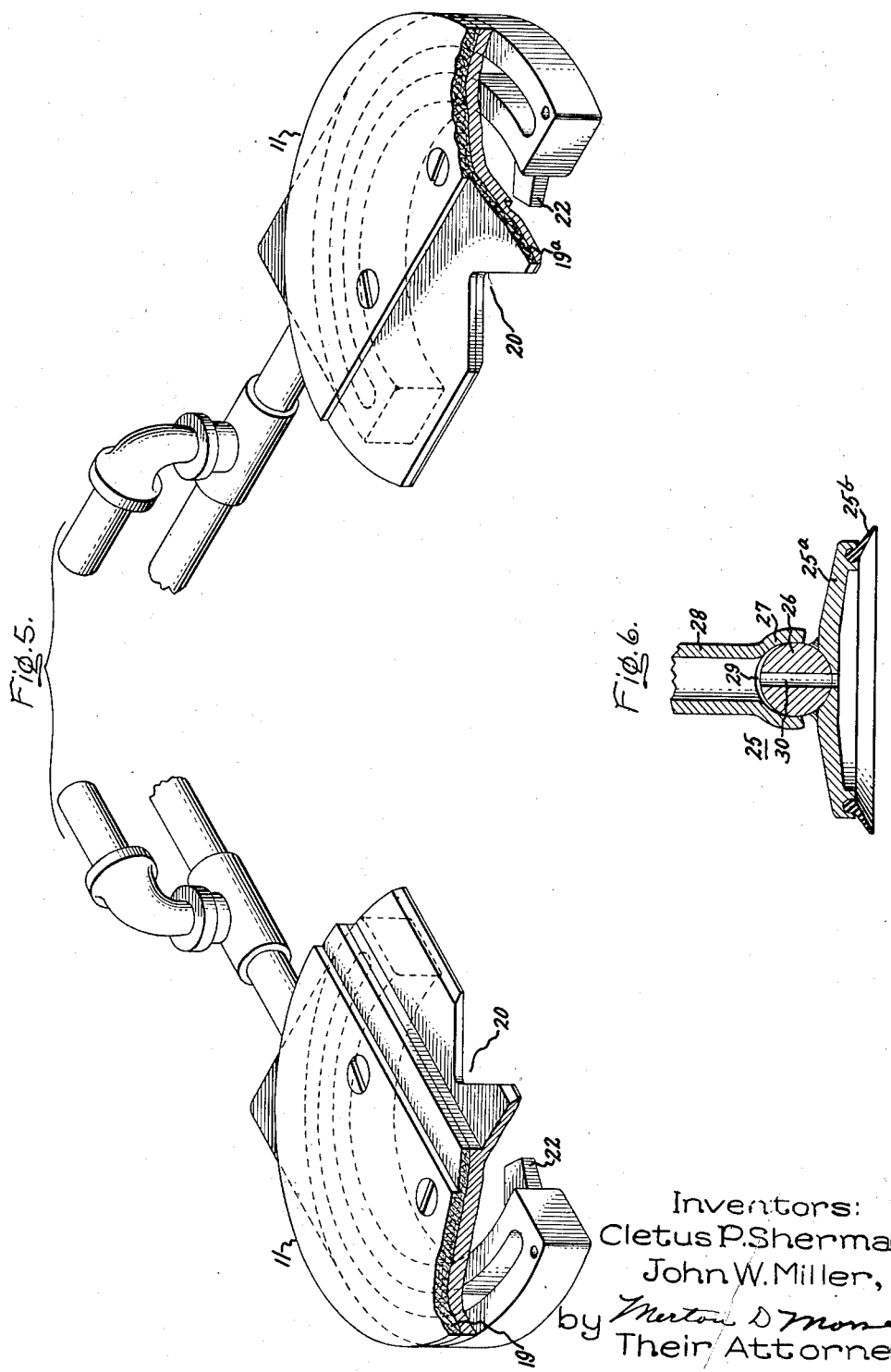
Inventors:
Cletus P. Sherman,
John W. Miller,
by Merton D. Moore
Their Attorney.

United States Patent Office 2,785,509
Patented Mar. 19, 1957

2,785,509

TUBE SEALING AND TIP-OFF MECHANISM

John W. Miller and Cletus P. Sherman, Schenectady, N. Y., assignors to General Electric Company, a corporation of New York Application July 8, 1952, Serial No. 297,614

11 Claims. (Cl. 49—2)

This invention relates to the sealing of cathode ray tubes, and in particular, to a machine that automatically seals and tips off cathode ray tubes.

A cathode ray tube is provided with an elongated neck having a flared mouth, and during the process of tube assembly, a stem of somewhat T-shaped cross section having an elongated tubulation and an integral transverse base portion including an axial passageway is fused to the tube neck to furnish an evacuating passageway.

After the stem has been sealed to the tube, the flared mouth is cut off to expose the bottom of the stem base. The tube is then ready for evacuation and sealing with the sealing being accomplished by heating and stretching the stem to effect a necking down or closing of the stem tubulation.

In the process of evacuating the tube before sealing, the tube is sent through an oven wherein the tube temperature is gradually raised to about 400° C. and then lowered so that the tube comes out of the oven at about 250° C. During the heating process, every attempt is made to drive off all the gases from the tube interior. For example, in addition to the heating, a getter or gas absorbing agent is flashed within the tube before it is brought out of the oven for sealing.

In the past, the sealing of the stem has been the work of highly skilled workmen using hand operated tipping torches. Tipping torches, generally are a Y-shape having a flame emanating from the free legs. The workman would position the torch adjacent the stem to heat the same to a plastic condition—a condition judged solely by the torch operator. When the workman was satisfied with the plasticity of the tubulation, he would lift the tube to stretch the stem about four inches to effect a necking down and sealing of the tubulation—guesswork operations.

In the manufacture of cathode ray tubes, however, it is necessary that precision tolerances be maintained in the stem cutoff point and, furthermore, the plastic temperature at which the stem is stretched be carefully regulated or else the heating and stretching process might produce a bubble in the thin wall section of the stem thereby causing a failure in the glass if it is not thick enough to resist the pressure differential between the outer and inner surfaces of the tube. Ideally, the stretch should be made as soon as the plasticity of the glass gets to the point where it cannot resist a pull of about three pounds. If the pull is made later than this, the glass is too soft and a hole might be produced in the tubulation wall.

The cutoff point must be so chosen that a plastic cap which is fitted over the neck of the cathode ray tube to connect it in a circuit would properly position itself with respect to the tip and with respect to the neck of the tube.

It is an object of this invention, therefore, to provide an automatic cathode ray sealing and tipping machine.

It is a further object of this invention to provide an automatic cathode ray sealing machine wherein the molten condition of the glass stem is determined before the stretching operation is performed.

It is a further object of this invention to provide an automatic tipping machine which selects a uniform tipping or cutoff point for each tube.

In the assembly line manufacture of cathode ray tubes, variations may exist between successive tubes which necessitate an adjustment in the mechanism for proper support in butting off the various tubes. For example, a group of 16" tubes might be followed by 20" tubes which in turn might be followed by 30" tubes.

Accordingly, it is a still further object of this invention to provide an automatic sealing off machine which adjusts itself to handle tubes of different sizes and which will handle them irrespective of variations in physical dimensions or imperfections of the tube face.

Further objects and advantages of this invention will become apparent and the invention will be more clearly understood from the following description, referring to the accompanying drawing and the features of novelty which characterize this invention will be pointed out with particularity in the claims annexed to and forming a part of this specification.

Briefly, this invention relates to a machine that automatically holds and stretches the tubulation of a cathode ray tube so that it has a uniform sealing off stem length. The device comprises clam-like jaws for encircling the stem of the tube to heat the same and a vacuum-like device for holding and pulling on the top of the tube. The jaws contain burners which direct a flame to the proper point on the stem for satisfactory stretching of the same. The device is automatically adapted to control the duration of heat application and the length of stretching the neck after proper heating.

In the drawing, Fig. 1 is a side view, partly in section, showing a stem positioned in the neck of a cathode tube; Fig. 2 is an end view of a tube mounted on an evacuating buggy; Fig. 3 is a side view of a stem that has been stretched to the sealing point; Fig. 4 is a perspective view of our improved tipping machine; Fig. 5 is a perspective view of the jaws which encircle the stem of the cathode ray tube to apply heat at the proper position along the stem; Fig. 6 is a side view partly in section of the vacuum chuck for engaging the face of the cathode ray tube; while Fig. 7 is a side view of the tube showing both the burners and vacuum chuck in two positions of elevation.

In the drawing (particularly Fig. 1) a cathode ray tube is shown having an elongated neck 2 ending in a flared mouth 3. A stem 4 comprising a base 5 and a tubulation 6 extends coaxially with neck 2 to form an extension thereof. The flared mouth 3 of the tube is cut off after the stem base has been fused to neck 2.

This tube structure is then placed in a buggy 7 shown in Fig. 2. Buggy 7 has an evacuating device 8 which is connected to stem 4 of the tube through a coupling 9 which grips tightly the lower extremity of tubulation 6. In the evacuating process, buggy 7 and tube 1 are sent through baking ovens (not shown) until the buggy reaches the tipping off or sealing off station on an assembly line.

The tipping device (see Fig. 4) comprises body 10, encircling or clam jaws 11, base or structure 12, and suitable mechanisms, hereinafter described for sealing off a cathode ray tube. For example, the tipping device includes a cylinder 13 having one end mounted on base 12. The cylinder 13 may be one of any of the many well-known and generally available air-operated types and includes a piston rod 13a adapted for being actuated longitudinally outwardly when pressure is applied to the cylinder 13 in the usual manner. When the piston is actuated it is effective to push body portion 10 of the tipping device into registering alignment with the stem 4 of a tube. Accordingly, body 10 is rotatably supported as by bushing 10a on base 12.

When body 10 has been aligned with tube neck 2, a cylinder 14, which may be of any well-known air-operated type, is activated to move a piston rod 15 to operate jaws 11; i. e., outward movement of rod 15 turns meshed gears 16, 17, shafts 18, 18a and gears 16a, 17a to close the jaws 11 about stem 4.

Activation of cylinder 14 can be through some mechanical or electrical or timing system of which an electric eye would be one example. Any specific operating mechanism certainly is not intended to be a limitation on the scope of this invention.

Jaws 11 have both a plurality of peripherally spaced gas flame apertures 22 and preferably an asbestos or flame-retarding upper sheet comprising the halves 19, 19a (see Fig. 5) which define together an aperture 20 for encircling closely the tube stem, i. e., when cylinder 14 is activated.

When clam shells 11 are closed, a second cylinder 21 is activated to raise the position of the asbestos plates 19, 19a until they engage a predetermined portion of the tube or, specifically, the under surface of base 5 of the stem thereby to direct a flame emanating from apertures 22 toward the proper point on stem 4 relative to the underside of the base.

In the illustrated embodiment, air pressure is released from cylinder 21 to permit springs 21a, 21b to raise supporting spider 23 until the asbestos plates are in contact with base 5. The supporting spider 23 is suspended by collars or other suitable devices (not shown) from rods 24, 24a which are affixed to base 10. Gear shafts 18, 18a are rotatable in but axially fixed relative both to spider 23 and pressure plate 23a which is supported by the gear shafts 18, 18a. Accordingly, all the gears, spider 23, gear shafts 18, 18a and the pressure plate 23a move vertically as a unit.

Fitted slidably on the shaft 24 is an elongated sleeve 50. The sleeve 50 is adapted for upward actuation through upward movement of the spider 23 and the upper end of the sleeve cooperates with a bifurcated end of a lever 51 pivotally mounted intermediate its ends in a stationary bracket 52. The other end of the lever 51 is apertured and fits loosely over the piston rod 53 of the cylinder 21. The piston rod 53 is connected to the pressure plate 23a and has a collar member 54 secured thereon. As will be clear from Figure 4 of the drawing, the length of the sleeve 50 and the cooperation between the sleeve, lever 51 and collar 54 determines the manner of upward movement of the spider and the flame-emanating elements when air pressure in the cylinder 21 is reduced.

After tube stem 4 has been suitably heated, it is necessary to neck it down to seal off the tube. Such a necking down is accomplished through a pull exerted by a vacuum chuck or plate 25. In the illustrated embodiment (see Fig. 6) vacuum chuck 25 is shown comprising a swivel plate 25a including a rubber ring or cup 25b, a ball 26 nested in a socket 27, a supporting shaft 28, and a vacuum locking device 29 for frictionally locking the swivel plate relative to shaft 28.

Vacuum locking device 29 is so constructed that by evacuating the air space between ball 26 and socket 27, the ball is frictionally locked to socket 27. This air space is evacuated when the shaft 28 and the rubber ring 24 are evacuated as through the central passage of the shaft 28 in a manner hereinafter described. It is to be noted that ball 26 has a central passageway 30 which interconnects the center of shaft 28 and the swivel plate 25a.

As will be clear from the drawing, and particularly Figures 3, 4 and 7, the tipping-off of the stem 6 occurs in the desired manner for effecting a straight and uniform seal when the tube is lifted vertically along its longitudinal axis which coincides with the longitudinal axis of the shaft 28. The swivel plate 25a is locked relative to the shaft during the tipping-off operation to insure that the tube will be lifted vertically along its longitudinal axis when the shaft 28 is actuated vertically.

Supporting shaft 28 is axially slideable within a bushing 31 (see Fig. 4) which in turn has an elongated slot 32 to provide for the axial movement of a T-connection 33 which connects the center shaft 28 with a vacuum source through a tube 55. A second tube 34a is connected to the T-connection 33 to activate vacuum-operated locking cylinder 34 in response to the application of vacuum to the T-connection. Cylinder 34 includes a piston, the outer end of which is indicated at 56. The piston 56 cooperates with a spaced pair of arms 57 formed off a yoke member 58 which, as shown, is integral with the lower end of the bushing 31 and normally fits loosely about the shaft 28. When vacuum is applied to the cylinder 34 it serves to draw the arms 57 together thereby to cause the yoke 58 to grasp and thus lock shaft 28 relative to bushing 31 thereby to fixedly position swivel plate 25 relative to bushing 31.

With this telescoping structure, swivel plate 25a can be moved relative to the bushing 31 so that it will embrace the face of a cathode ray tube irrespective of the height and tube face contour. When ring 25b is seated on the tube face, swivel plate 25a is evacuated and cylinder 34 is activated to lock plate 25a and shaft 28, respectively, relative to the bushing 31. Through this unique telescoping arrangement our improved device is automatically compensating whereby it can handle a variety of height and sizes of tubes.

With respect to the raising and lowering of swivel plate 25a for engagement with the tube face, it is to be noted that we do not wish to be limited to any particular method or arrangement for effecting the movement. In the illustrated embodiment, however, one method of producing the required motion is shown as a hydraulic device 35a including valves for directing fluid to a selected side of a piston. The device 35a may be one of any great number of well-known and generally available devices adapted for selectively controlling the flow of fluid to the operating side of a two-way hydraulic arrangement such as that comprising the piston 35 and cylinder 36, and there is no need to describe herein the internal structure of any particular device that may be suitably employed at 35a.

In Fig. 4 piston 35 is shown adjacent the upper end of cylinder 36. At a suitable instant, for example, when pressure plate 23a is raised by the springs 21a and 21b, a switch 37 is closed energizing the device 35a for controlling a flow of fluid to the upper side of piston 35 thereby lowering bushing 31 and swivel plate 25a until cup 25b embraces the face of a tube. When cup 25b reaches the tube face, a limit switch 38 dependent on tube size is closed by an arm 38a secured to shaft 28. Limit switch 38 performs three functions namely (1) it deenergizes the device 35a in respect to its operation in directing a flow of fluid to the top of piston 35; (2) it controls a valve (not shown) to apply vacuum to the T-connection 33 thereby locking swivel plate 25a and shaft 28 relative to bushing 31; and (3) it operates an indexing mechanism hereinafter described to apply an initial push of, say, 12 lbs. for a 10 lb. tube to the underside of piston 35.

When shaft 28 and swivel plate 25a have been vacuum locked, the cathode ray tube 1 is ready to be stretched for seal-off, but the stretching does not take place until the glass neck has been heated to a suitable temperature, determined by the plasticity of the glass.

One method of determining the suitable stretching temperature is by energizing the device 35a through an indexing device which may be one of any well-known and generally available types of mechanism which are selectively presettable and adapted when operated to control the amount of energization of another device. Thus, the device 35a, under the influence of the indexing device, applies an initial pressure to the underside of the piston 35. The initial pressure is slightly greater than the weight of the tube to be sealed, whereupon the tensile strength of the tubulation 6 of stem 4 is the only element exerting a force to restrain the lifting of the tube 1. The effect of this construction is to permit an immediate sensing of the satisfactory plasticity of the tubulation 6. That is, as soon as tubulation 6 is heated to a suitable temperature, it loses its tensile strength and the initial force applied to the underside of the piston 35 will cause a slight stretching of the tubulation. This initial stretching can in one embodiment cause a release of limit switch 38, which in turn controls by means of the device 35a the flow of fluid to the underside of piston 35 to cause a rapid rising of piston 35 and hence a rapid stretching of the tubulation 6 of stem 4.

With an indexing system of this type it is possible to use our new sealing off method for tubes of various weights, e. g., for 10 inch tubes, 12 inch tubes or even 30 inch tubes.

Proper stretching of the tubulation 6 is indicated when the arm 38a hits the second limit switch 39. Switch 39 shuts off the flow of fluid to the underside of piston 35 and simultaneously controls a jet flame which is directed at tubulation 6 to cut it off. It is noted that the distance between limit switches 38 and 39, also the length of cylinder 36, is about 8 inches to allow for a telescoping action necessary for tube height variation. Eight inches is also a maximum length of stretch for the tubulation 6 to effect a seal-off.

The operation of the above structure is as follows: when buggy 7 moves tube 1 to the sealing off station of an assembly line, cylinder 13 actuates body 10 moving it into alignment with neck 4 and tube 1. Then piston 14 actuates rod 15 causing jaws 11 to encircle the stem 4 of cathode ray tube 1. Piston 21 is then actuated to raise asbestos plates 19, 19a into engagement with base 5a of stem 4. The raising of the asbestos plates simultaneously effects the closing of switch 37 by pressure plate 23a. This controls the hydraulic device 35a directing a flow of fluid at the upper side of piston 35 causing swivel plate 25a and ring 25b to engage the face of the cathode ray tube. As the swivel plate 25 comes into contact with the face of the tube, causing an arm 38a to actuate switch 38 thereby (1) controlling the vacuum supply to the T-connection 33 locking shaft 28 and swivel plate 25 relative to bushing 31, (2) limiting the downward travel of the bushing 31 by cutting off the flow of fluid to the upper side of piston 35 and (3) energizing the indexing system which through the predetermined energization of the device 35a supplies an initial pressure to the under side of piston 35. Actually, the three actions described here can occur by the contacting of switch 38 or a similar switch so positioned to compensate for various tube heights. The actions, of necessity, cannot occur simultaneously but are time controlled in the order listed.

The indexing device supplies a push slightly greater than the weight of the tube so that when the tubulation 6 has been heated any slight stretching causes the release of switch 38 thereby directing a greater flow of fluid to the underside of piston 35 raising the whole assembly including bushing 31, shaft 28, swivel plate 25a and tube 1 to stretch the tubulation 6 satisfactory distance to effect the sealing off.

The satisfactory length of stretch is indicated by an arm 38a hitting a second limit switch 39 which (1) stops the movement of the piston 35 and (2) directs a flame through the nozzle 40 to effect the cutoff of the tubulation 6 whereby a sealed tube is produced.

While this invention has only been described with relation to its basic elements and while the limit switches have been indicated as fixed for one size of tube, it is obvious that refinements in modifications will occur to those skilled in the art and it is desired to be understood, therefore, that this invention is not to be limited to the particular embodiments disclosed but rather it is intended to cover all modifications which are within the spirit and scope of this invention.

What we claim as new and desire to secure by Letters Patent of the United States is:

1. A device for sealing vacuum tubes having an elongated tubulation in one end thereof comprising a body, a stand, encircling jaws, means for moving said body relative to said stand to align said jaws with said tubulation, means for closing said jaws about said tubulation, said jaws being movable longitudinally along said tubulation following closing of said jaws about said tubulation means for holding the lower end of said tubulation, said jaws having flame emanating means integrally formed therein for heating said tubulation, means for raising said jaws into engagement with a predetermined portion of said tube to direct a flame at the proper position on said tubulation relative to said predetermined portion, vacuum means for gripping the end of said tube opposite said tubulation, and means for lifting said vacuum means to stretch said tubulation, thereby to seal said tube.

2. A device for sealing vacuum tubes having an elongated tubulation in one end thereof comprising a body, a stand, encircling jaws, means for moving said body relative to said stand to align said jaws with said tubulation, means for closing said jaws about said tubulation, means for holding the lower end of said tubulation, said jaws having flame emanating means therein, means for raising said jaws into engagement with a portion of said tube to direct a flame at the proper position on said tubulation, means for gripping the end of said tube opposite said tubulation, means for lifting said gripping means to stretch said tubulation, means for imparting an initial pull to said lifting means to overcome the weight of a tube to be sealed and means cooperative with said initial pull means responsive to the loss of tensile strength in said tubulation for operating said lifting means.

3. A device for sealing vacuum tubes having an elongated tubulation in one end thereof comprising a body, a stand, encircling jaws, means for moving said body relative to said stand for registering said jaws with said tubulation, means for closing said encircling jaws about said tubulation, means for holding the lower end of said tubulation, said jaws having flame emanating means therein, means for raising said jaws into engagement with a portion of said tube to direct a flame at the proper position on said tubulation, vacuum means including a vacuum plate for gripping a surface of said tube opposite said tubulation, means responsive to the raising of said jaws for operating said vacuum means to lower the same into engagement with said tube surface, and means for lifting said vacuum means to stretch said tubulation thereby to seal said tube.

4. A device for sealing vacuum tubes having an elongated tubulation in one end thereof comprising a body, a stand, encircling jaws, means for moving said body relative to said stand for registering said jaws with said tubulation, means for closing said encircling jaws about said tubulation, means for holding the lower end of said tubulation, said jaws having flame emanating means therein, means for raising said jaws into engagement with a portion of said tube to direct a flame at the proper position on said tubulation, means for gripping said tube, means responsive to the raising of said jaws for operating said gripping means to lower the same into engagement with said tube surface, means responsive to the lowering of said gripping means for effecting a gripping of a tube to be sealed and means for lifting said gripping means to stretch said tubulation thereby to seal said tube.

5. A device for sealing vacuum tubes having an elongated tubulation in one end thereof comprising a body, a stand, encircling jaws, means for moving said body relative to said stand for registering said jaws with said tubulation, means for closing said encircling jaws about said tubulation, means for holding the lower end of said tubulation, said jaws having flame emanating means therein, means for raising said jaws into engagement with a portion of said tube to direct a flame at the proper position on said tubulation, vacuum means including a vacuum plate for gripping a surface of said tube opposite said tubulation, means responsive to the raising of said jaws for operating said vacuum means to lower the same into engagement with said tube surface and for locking said vacuum plate in position relative to said lifting means, and means for lifting said vacuum means relative to said jaws to stretch said tubulation, thereby to seal said tube.

6. A device for sealing vacuum tubes having an elongated tubulation in one end thereof comprising a body, a stand, encircling jaws, means for moving said body relative to said stand for registering said jaws with said tubulation, means for closing said encircling jaws about said tubulation, means for holding the lower end of said tubulation, said jaws having flame emanating means therein, means for raising said jaws into engagement with a portion of said tube to direct a flame at the proper position on said tubulation, vacuum means including a vacuum plate for gripping a surface of said tube opposite said tubulation, means responsive to the raising of said jaws for operation of said vacuum means to lower the same into engagement with said tube surface, means responsive to the lowering of said vacuum means for evacuating said vacuum plate to effect a gripipng of a tube to be sealed, means for imparting an initial pull to said lifting means to overcome the weight of a tube to be sealed and means responsive to loss of tensile strength in said tubulation for operating said lifting means to stretch said tubulation thereby to seal said tube.

7. A device for sealing vacuum tubes having a tubulation in one end thereof comprising; means for supporting a tube, means for holding the lower end of said tubulation, means adapted for heating said tubulation at a predetermined position above said end of said tubulation, means for gripping the end of said tube opposite said tubulation, means for lifting said gripping means to stretch said tubulation, means for imparting an initial pull to said lifting means to overcome the weight of a tube to be sealed, and means cooperative with said initial pull means responsive to the loss of said tensile strength in said tubulation for operating said lifting means.

8. A device for sealing vacuum tubes having a tubulation in one end thereof comprising; means for supporting a tube, means for holding the lower end of said tubulation, means adapted for heating said tubulation at a predetermined position above said end of said tubulation, vacuum means including a vacuum plate for gripping a surface of said tube opposite said tubulation, means responsive to the positioning of said heating means for operating said vacuum means to lower the same into engagement with said tube surface, and means for lifting said vacuum means to stretch said tubulation thereby to seal said tube.

9. A device for sealing vacuum tubes having a tubulation in one end thereof comprising; means for supporting a tube, means for holding the lower end of said tubulation, heating means adapted for being raised into engagement with a portion of said tube for heating said tubulation at a predetermined position below said portion of said tube, means for gripping said tube, means responsive to the raising of said heating means for operating said gripping means to lower the same into engagement with said tube surface, means responsive to the lowering of said gripping means for effecting a gripping of a tube to be sealed, and means for lifting said gripping means to stretch said tubulation thereby to seal said tube.

10. A device for sealing vacuum tubes having a tubulation in one end thereof comprising; means for supporting a tube, means for holding the lower end of said tubulation, heating means, means for raising said heating means into engagement with a portion of said tube to effect heating of said tubulation at a predetermined position below said portion of said tube, vacuum means including a vacuum plate for gripping a surface of said tube opposite said tubulation, means responsive to the raising of said heating means for operating said vacuum means to lower the same into engagement with said tube surface and for locking said vacuum plate in position relative to said means for raising said heating means, and means for lifting said vacuum means relative to said heating means to stretch said tubulation, thereby to seal said tube.

11. A device for sealing vacuum tubes having a tubulation in one end thereof comprising; means for supporting a tube, means for holding the lower end of said tubulation, heating means, means for raising said heating means into engagement with a portion of said tube to effect heating of said tubulation at a predetermined position below said portion of said tube, vacuum means including a vacuum plate for gripping a surface of said tube opposite said tubulation, means responsive to the raising of said heating means for operating said vacuum means to lower the same into engagement with said tube surface, means responsive to the lowering of said vacuum means for evacuating said vacuum plate to effect a gripping of a tube to be sealed, means for imparting an initial pull to said lifting means to overcome the weight of a tube to be sealed and being responsive to the loss of tensile strength in said tubulation for operating said lifting means to stretch said tubulation, thereby to seal said tube.

References Cited in the file of this patent
UNITED STATES PATENTS

| 1,647,644 | Madden et al. | Nov. 1, 1927 |
| 1,936,426 | Eisler | Nov. 21, 1933 |
| 2,197,527 | Madden | Apr. 16, 1940 |
| 2,215,100 | Gustin | Sept. 17, 1940 |
| 2,273,445 | McGowan et al. | Feb. 17, 1942 |
| 2,494,923 | Yoder et al. | Jan. 17, 1950 |